United States Patent
Oberle et al.

(10) Patent No.: US 9,670,988 B2
(45) Date of Patent: Jun. 6, 2017

(54) GEAR/DRIVE UNIT

(75) Inventors: Hans-Juergen Oberle, Rastatt (DE); Willi Schmidt, Stutensee-Buechig (DE); Andreas Lienig, Buehl (DE)

(73) Assignee: Robert Bosch GmbH, Stuttgart (DE)

(*) Notice: Subject to any disclaimer, the term of this patent is extended or adjusted under 35 U.S.C. 154(b) by 2179 days.

(21) Appl. No.: 11/574,305

(22) PCT Filed: Aug. 12, 2005

(86) PCT No.: PCT/EP2005/053979
§ 371 (c)(1),
(2), (4) Date: Feb. 26, 2007

(87) PCT Pub. No.: WO2006/024598
PCT Pub. Date: Mar. 9, 2006

(65) Prior Publication Data
US 2007/0289135 A1 Dec. 20, 2007

(30) Foreign Application Priority Data
Aug. 31, 2004 (DE) .......................... 10 2004 042 457

(51) Int. Cl.
*F16H 13/00* (2006.01)
*F16H 1/16* (2006.01)
*B60N 2/02* (2006.01)

(52) U.S. Cl.
CPC .............. *F16H 1/16* (2013.01); *B60N 2/0232* (2013.01); *B60N 2002/0236* (2013.01); *Y10T 29/49464* (2015.01); *Y10T 74/19642* (2015.01)

(58) Field of Classification Search
USPC ... 74/425, 89.34, 424.75, 427, 89.14, 89.23, 74/89.37, 89.36; 296/656.15
See application file for complete search history.

(56) References Cited

U.S. PATENT DOCUMENTS 3,416,386 A * 12/1968 Pickles ...................... 74/89.37
5,259,257 A    11/1993 Mouri
5,320,413 A *  6/1994 Griswold et al. ........ 297/362.12
5,572,906 A    11/1996 Jorg
(Continued)

FOREIGN PATENT DOCUMENTS

DE       4331822      3/1995
EP       0759374      2/1997
(Continued)

OTHER PUBLICATIONS

International Search Report from European Patent Office.

*Primary Examiner* — Terence Boes
(74) *Attorney, Agent, or Firm* — Michael Best & Friedrich LLP

(57) ABSTRACT

A gear drive unit (1), for a seat adjuster or a power-assisted steering system, comprised of a spindle (40), on which a drive gear (42) that drives the spindle (40) is provided, a drive assembly (20), which drives the drive gear (42) by means of a driven element (500) and at least one device (30) on which the drive assembly (20) is at least flanged-mounted, and which operationally couples at least the driven element (500) and the drive gear (42). The invention provides that at least one additional support (100, 100') is provided in which the drive gear (42) is mounted, and this support is fastened to the base part (50) and supports the device (30).

23 Claims, 2 Drawing Sheets

(56) References Cited

U.S. PATENT DOCUMENTS

| | | | |
|---|---|---|---|
| 5,613,402 A * | 3/1997 | Gauger et al. | 74/425 |
| 6,386,056 B1 | 5/2002 | Bachnak et al. | |
| 6,575,421 B1 * | 6/2003 | Houston et al. | 248/429 |
| 2005/0115343 A1 * | 6/2005 | Sakamaki | 74/89.23 |

FOREIGN PATENT DOCUMENTS

| | | |
|---|---|---|
| EP | 1223073 | 7/2002 |
| JP | 1157553 U | 10/1989 |
| JP | 1249575 A | 10/1989 |
| JP | 3071807 U | 7/1991 |
| JP | 8504017 | 4/1996 |
| JP | 2001245212 | 9/2001 |
| JP | 2001343052 A | 12/2001 |
| RU | 2159717 C1 | 11/2000 |
| WO | 2006024598 | 3/2006 |

\* cited by examiner

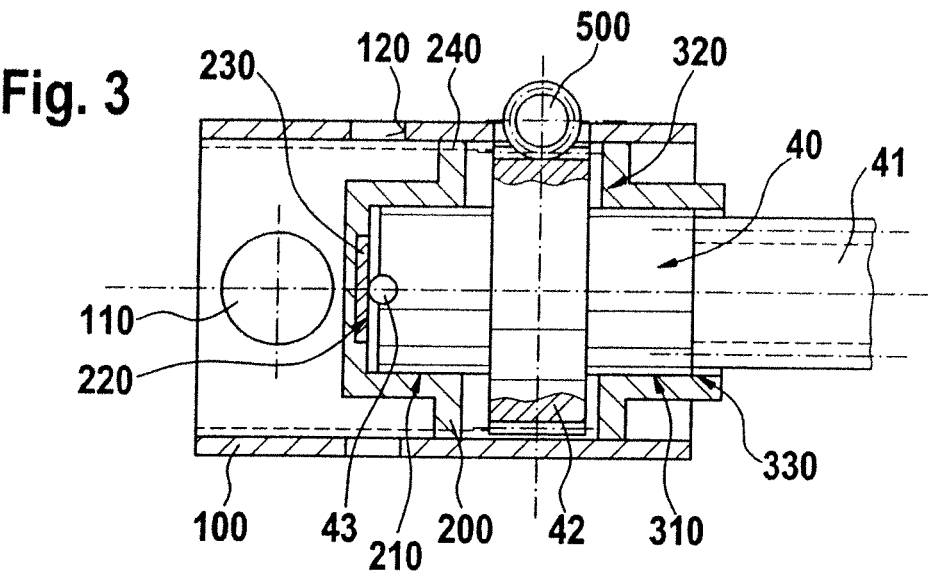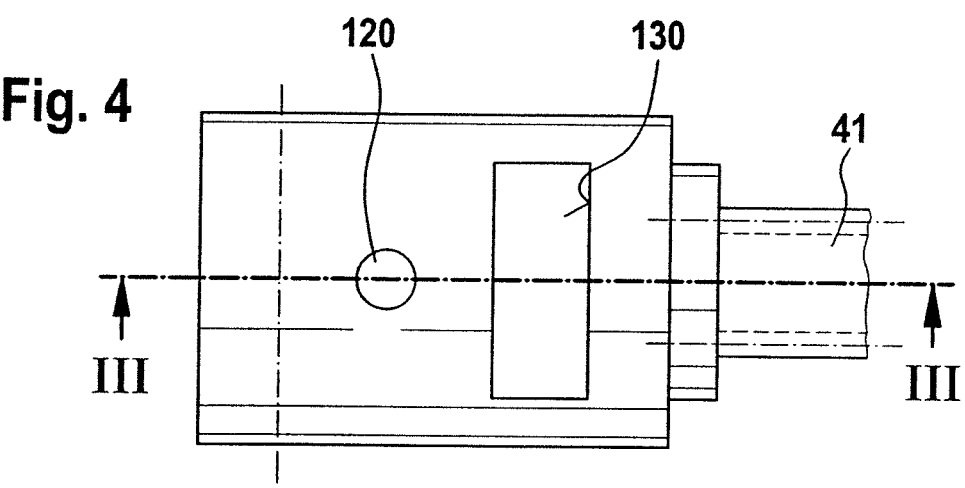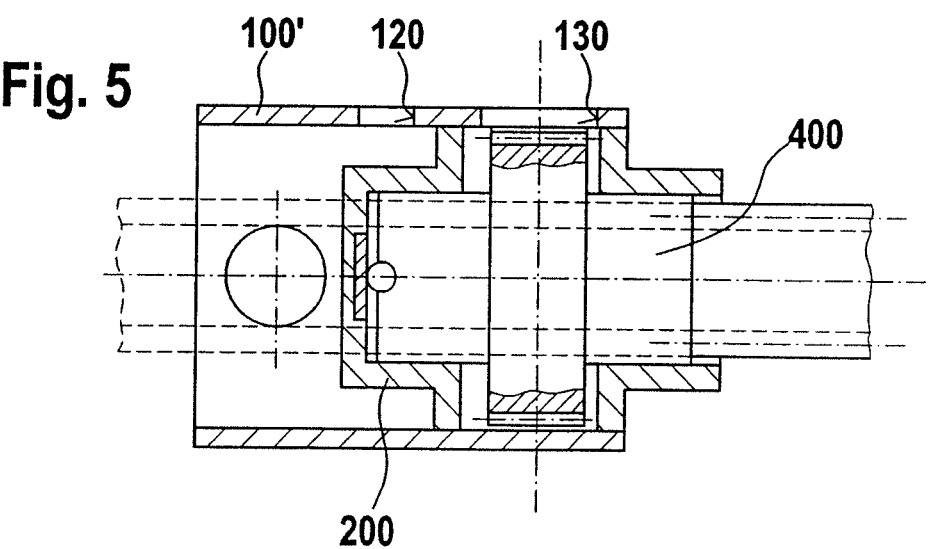

GEAR/DRIVE UNIT

BACKGROUND OF THE INVENTION

The invention relates to a gear drive unit, particularly for a seat adjuster or a power-assisted steering system in a motor vehicle.

A device for adjusting a seat in a motor vehicle in known from EP 0 759 374 or DE 43 31 822, which is fastened on a base part, and is comprised of a spindle on which a drive gear that drives the spindle is provided, a drive assembly, which drives the drive gear by means of a driven element and at least one device on which the drive assembly is at least flanged-mounted and which operationally couples at least the driven element and the drive gear.

In the case of a seat adjuster motor with a spindle drive, a spindle is inserted into a gear housing, which is generally already connected to a motor. The inserted spindle is often executed as a composite part and is comprised in the simplest case of the spindle, a sprayed-on worm wheel and an axial point abutment, which is executed, e.g., as a ball. Additional add-on parts to the spindle, like a spindle nut, limit stop sleeve are conceivable. The spindle should be mounted as free of play as possible in the gear housing so that the operating forces on the spindle ideally do not cause any axial lift of the spindle in the gear housing. The lack of play is achieved as a rule by measuring the gear housing and inserting a matching thrust washer. The lack of play can be supported, e.g., by the additional insertion of a spring element. In order to optimize the friction conditions on the worm wheel, an axial bearing disc can also be mounted on the side opposite from the point abutment.

In addition to the operating forces that arise, spindle motors must also support crash forces (tensile and compressive forces), and depending upon the application case, the gear housing is therefore executed in plastic or metal. Future requirements are tending to lean towards higher crash requirements. In general, the metal housing required for this necessitates more expensive rework steps in order to comply with tolerances. In this case, a lateral opening that is designed to be vertical to the spindle axis for inserting the spindle has a fundamentally negative effect on the strength of the gear housing, i.e., the gear housing tends to bend open under tensile loads, After the spindle is mounted in the gear housing, the housing is closed by means of a gear cap, e.g., via screw down. The position of a customer-side connection borehole can be placed in different positions around the spindle axis. As a result, this often requires a new gear housing for each application.

SUMMARY OF THE INVENTION

Therefore, creating a simpler design for spindle motors that does justice to the requirements described above is the objective of the present invention.

The advantage of the gear drive unit in accordance with the invention is that the required components are reduced and simplified, thereby resulting in lower costs. In addition, assembly is simplified; it is not necessary to calibrate parts. Moreover, there is greater flexibility in terms of the position of the customer-side screw-down borehole. Finally, heightened crash requirements are met.

In this case, a gear drive unit is provided, particularly for a seat adjuster or a power-assisted steering system, which is fastened on a base part and is comprised of a spindle, on which a drive gear that drives the spindle is provided, a drive assembly, which drives the drive gear by means of a driven element and at least one device on which the drive assembly is at least flanged-mounted and which operationally couples at least the driven element and the drive gear, wherein at least one additional support is provided in which the drive gear is mounted, and this support is fastened to the base part and supports the device.

A more compact and simpler structure is achieved which can absorb high crash forces if the support has at least the shape of a tube, and at least a first bearing cap is provided, which is fastened in the support and positions the drive gear axially and radially on one side.

The arrangement is then completed in that a second bearing cap is provided, which is fastened in the support and positions the drive gear axially and radially on the other side, or that the support has the shape of a pot and positions the drive gear axially and radially on the other side.

The support preferably has at least one radial recess, through which the driven element of the drive assembly and the drive gear are connected to one another. This produces the furthest possible closed structure of the support, whereby high crash forces can be absorbed.

A particularly simple method for assembling is produced in that the spindle, the drive gear and the support form a first main assembly, that the driven element, the drive assembly and the device form a second main assembly and that the first and second main assemblies are each assembled separately first and then fit together. In this case, the axial play of the drive gear is minimized during assembly by pushing together the drive gear and the support and at least one bearing cap.

BRIEF DESCRIPTION OF THE DRAWINGS

One exemplary embodiment is depicted in the drawings and described in greater detail in the following description. The drawings show:

FIG. 3 A section of the gear drive unit according to intersecting lines from FIG. 2.

FIG. 4 A top view of FIG. 3.

FIG. 5 The section from FIG. 3 with a modification.

DETAILED DESCRIPTION

Figure 1:
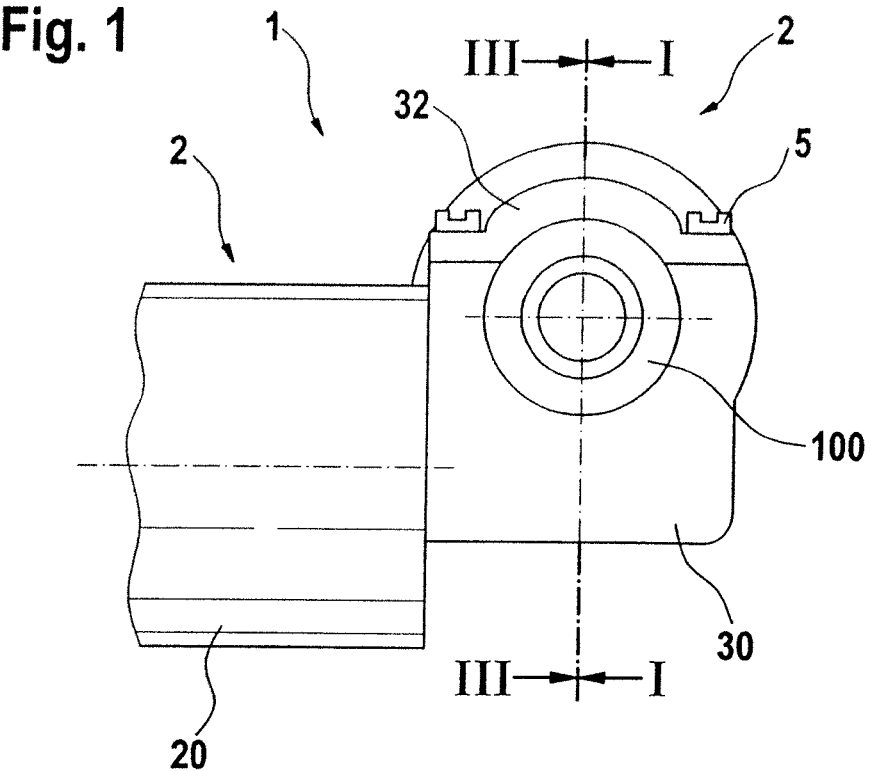
FIG. 1 A section of a gear drive unit according to intersecting lines I-I in FIG. 2.
Figure 2:
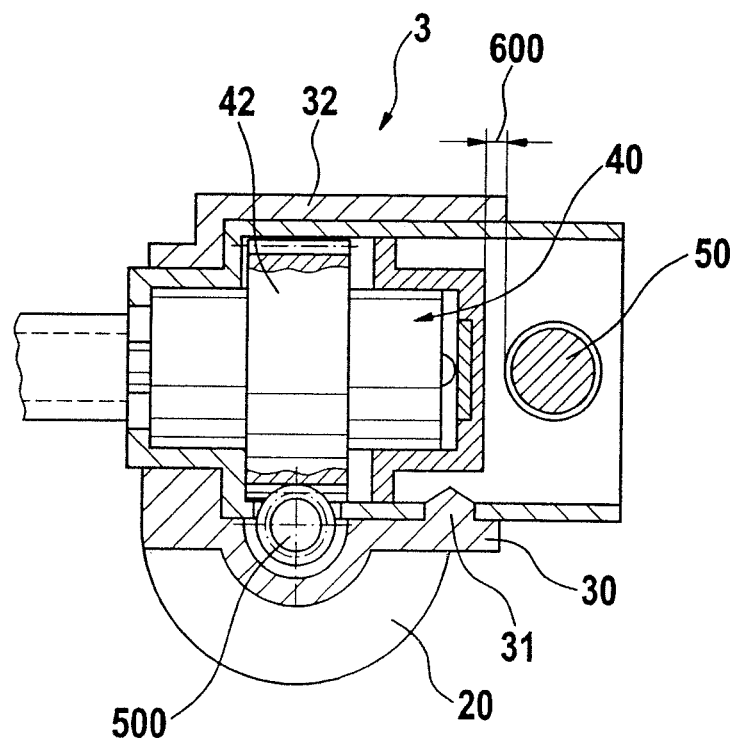
FIG. 2 A side view according to FIG. 1.

The spindle drive 1 depicted in FIGS. 1 and 2 is comprised of two main assemblies 2, 3 with different functions. The first main assembly 2 includes a drive assembly 20, e.g., an electric motor, with a worm 500, a gear housing 30 and the gear cover 32. This assembly 2 is used to accommodate and drive the second main assembly 3.

The second main assembly 3 represents a spindle module. It forms an interface, positions the worm wheel, and supports the operating forces and crash forces. The passive functions, i.e., supporting crash forces, are fulfilled without the help of the first main assembly 2. The second main assembly 3 includes a tubular support 100, wherein the profile of the tube can be embodied in different ways, e.g., round, flattened, rectangular, etc. The support 100 can be manufactured using different fabrication methods, e.g., rolled, drawn, cast, etc.

According to FIGS. 3 through 5, areas 110, 120, 130 with different functions that are depicted here as recesses are provided in the support 100. The introduction of these areas ideally occurs during the fabrication process of the support 100. The functions are as follows:

The area 110 embodied as a recess forms the customer-side interface (shown round), which can be executed on the circumference in any contour and position. The flexibility with respect to the customer interface is thereby increased without modifications having to be made to a gear housing with a complicated structure.

The area 120 embodied as a recess is used for positioning the spindle module during subsequent assembly in the gear housing, as is the case with recess 110, the contour and position can be freely selected.

As a rule, the areas 110 and 120 do not have to represent recesses, but can also be embodied as projections, brackets, etc.

The area 130 is executed as an opening. Its contour should be selected so that engagement of the worm 500, which is not a part of the spindle module, i.e., of the second assembly 3, in the worm wheel 42 of the spindle component 40 is guaranteed. The interface between the two main assemblies 2 and 3 is formed via this opening.

FIG. 3 shows the other components of the second main assembly 3. Situated in the tubular support 100 is a bearing cap 200, which positions the composite part, the spindle component 40, made up of the actual spindle 41, the worm wheel 42 and a ball 43 that forms a point abutment, radially at location 210 and axially at location 220. The radial positioning 210 of the spindle component 40 is accomplished by means of a cylindrically executed area in the bearing cap 200. The axial positioning 220 is realized via a point abutment, wherein depending upon the material and the operating forces, axial positioning 220 can take place directly in the bearing cap 200 or optionally via an additional thrust plate 230. The punctiform axial positioning of the spindle component 40 does not have to be accomplished via a ball 43. For example, a spherical cap can also be attached directly to the actually spindle 41. The bearing cap can be embodied as a metal, plastic or composite part.

A bearing cap 300 assumes the radial positioning at location 310 and the axial positioning at a location 320 and/or 330 of the spindle on the side opposite from the bearing cap 200. The radial positioning 310 in the bearing cap 300 corresponds to that in the bearing cap 200. The axial positioning 220 and/or 230 is not executed as a point abutment, but forms a flat abutment. Depending on the application case, the abutment surfaces 320 or 330 can optionally be used for positioning. Ideally, axial positioning is accomplished via the abutment surface 330 since in this case the frictional radius is smaller, and the friction losses are therefore reduced. A suitable selection of material and surface quality can allow a thrust washer to be dispensed with if need be.

Ideally, prior to assembly of the spindle component 40, one of the bearing caps 200 or 300 is already pre-mounted in the support 100, e.g., by rolling up or another connecting process, wherein the connection shall be selected such that it can support at least the operating forces that occur. With respect to the bearing cap 300, the connection must be selected such that the crash forces occurring must also be supported along with the operating forces. A minimum of the operating forces must be supported on the bearing cap 200 since the spindle component 40 in the case of a loose bearing cap 300 in a crash can be supported by the fastening bolt 50 projecting through the customer-side borehole 110, i.e., the spindle component 40 and the bearing cap 200 are applied against the fastening bolt 50.

The structural design of a gap 600 between the spindle component 40 and the fastening bolt 50 determines the maximum lift of the spindle component 40 in a crash and should be as small as possible as a rule.

After insertion of the spindle component 40, the second bearing cap 300 is preferably mounted such that it pressed against the spindle component 40 with a defined force. Then the connection between the bearing cap 300 and the support 100 is produced. The connecting technique is preferably selected such that no additional axial forces besides the defined axial initial stress act on the spindle component 40 and the operating or crash forces can be absorbed. Thus, a defined play-free condition is produced without additional parts or measurements.

FIG. 5 depicts a development of the second main assembly 3 as compared with FIG. 3. Instead of a tube profile, an offset tubular or pot-shaped support 100' is used, manufactured e.g., by deep drawing. In other words, the bearing cap 300 according to FIG. 3 is formed directly on the support 100'. What is advantageous as compared with the embodiment in FIG. 3 is that a component is saved and no connection, which also supports crash forces in addition to operating forces, has to be produced between the parts. Especially with respect to crash requirements, in the case of a design in accordance with FIG. 5, using material with different strength properties (e.g., tensile strength), or simple geometric modifications (e.g., wall thicknesses), can produce great changes with respect to the crash strength. The additional functions are represented as already described. To assemble the second main assembly 3, the spindle component 40 is inserted into the support 100' and then the bearing cap 200 is fixed in the support 100' with a defined initial stress, as already described.

For complete assembly, the spindle module, i.e., the second main assembly 3, is inserted into the gear housing 30 that is connected to the motor 20 in accordance with FIG. 1. The positioning of the second main assembly 3 with respect to the first main assembly 2 or the motor part 20 with the worm 500 can be accomplished, e.g., by means of a pin 31 in the gear housing and a borehole 12 in the support. The worm 500 thereby engages in the drive gear or the worm wheel 42 of the spindle module. The positioning does not absolutely have to be realized by means of a borehole, but can also be secured by other measures, such as, e.g., impressions, etc. The final fixation of the second main assembly 3 (the spindle module) is accomplished by assembly and fixation of the gear cover 32. Even in this case, the fixation of the gear cover 32 by means of a screwed connection 5 is described only as an example, alternative fastening possibilities, such as clipping, stamping, welding, etc., are also conceivable.

The gear housing 30 does not have to be embodied as shown as a housing enclosing the support 100. It suffices if it at least fulfills the function of a bracket or a flange, which couples the worm 500 and the worm wheel 42 with one another. To do so, the electric motor 20 and the support 100 only must only be flanged-mounted to the bracket or flange or another device.

In the exemplary embodiment shown, the bearing cap 200 is inserted and rolled up, secured, welded or fastened in another manner. However, it is also possible for the bearing cap 200 to have an outer thread on its outer circumference 240, which is screwed into a corresponding inner thread of the support 100. This is indicated with dashed lines. As a result, the axial play of the spindle component 40 can be adjusted to be free of play. In addition, the axially acting force is thereby absorbed. It is only necessary for a lock against rotation to be provided for the thread on the outer circumference 240. This can be accomplished, e.g., by securing or another method. The positioning is improved as a result and the tolerances are reduced. In addition, the plastic bearings in the worm wheel can be eliminated, and the spindle component 40 can be positioned directly in plastic. Moreover, the strength of the tube covering is increased since the force absorption is accomplished via a thread and no longer via the securing. Finally, assembly is simplified.

The initiated operating and crash forces are absorbed in the axial direction by the thread, which is designed accordingly. As a result, the strength is no longer dependent on the process. The possible securing is ultimately used only to lock the components from rotating. As a result, it is guaranteed that even in the case of a crash the motor 20 will not break; therefore, no support is needed for the customer interface i.e., the fastening bolt 50.

This concept can be used for spindle motors with rotating spindles (axially stationary and rotating spindle, on which the gear toothing is arranged in a rotationally secured manner) or for immersion spindle motors (axially movable spindle, which is driven by a worm wheel with an inner thread and which penetrates through said worm wheel on both sides). The bearing cap 200 that is executed as a plastic part can be embodied both with pocket-hole boreholes (in the case of the rotating spindle concept) as well as with through bores (in the case of the immersion spindle concept). The side walls of the borehole are used in both cases for the radial positioning of the thread spindle or the worm wheel, depending upon the design of the motor. In the case of a pocket-hole borehole, a hardened thrust plate 230 can then be introduced, via which the axial positioning can be executed. In the design with a through bore, a collar is used as the axial bearing.

In addition to the pot-shape shown with the projecting flanges, the bearing cap 200 can also have a constant outside diameter.

As the dashed line in FIG. 5 shows, the modular structure described above can also be used for motor concepts with penetrating-through spindles. The axial positioning in this case is executed on both sides as a surface.

Instead of the worm gear depicted, a gear with a face gear can also be used.

The invention claimed is:

1. A gear drive unit (1), which is fastened on a base part (50), the gear drive unit (1) comprising:
   a spindle (40), on which a drive gear (42) that drives the spindle (40) is provided;
   a drive assembly (20), which drives the drive gear (42) by a driven element (500); and
   a gear housing (30) on which the drive assembly (20) is mounted and which operationally couples at least the driven element (500) and the drive gear (42),
   wherein at least one additional support (100, 100') is positioned in the gear housing such that the driven element (500) is disposed at least partially radially outside of the at least one additional support (100, 100'), and the drive gear (42) is mounted in the at least one additional support, and the at least one additional support is fastened to the base part (50) and supports the gear housing (30), in that the at least one additional support (100, 100') is substantially tubular in shape, and in that the at least one additional support (100, 100') has at least one radial opening (130), through which the driven element (500) of the drive assembly (20) and the drive gear (42) are connected to one another, and wherein the at least one additional support further includes an area (110) that forms a customer-side interface.

2. Gear drive unit (1) according to claim 1, further comprising at least a first bearing cap (200) which is fastened within the support (100, 100') and positions the drive gear (42) axially and radially on one side.

3. Gear drive unit (1) according to claim 2, wherein the at least first bearing cap (200) has an outer thread on the outer circumference, with which it is screwed into a corresponding inner thread of the support (100, 100').

4. Gear drive unit (1) according to claim 2, wherein a second bearing cap (300) is provided, wherein the second bearing cap (300) is fastened within the support (100) and positions the drive gear (42) axially and radially on an other side.

5. Gear drive unit (1) according to claim 2, wherein the support (100') and the first bearing cap (200) are joined to have the shape of a cup and position the drive gear (42) axially and radially on an other side.

6. Gear drive unit (1) according to claim 3, wherein a second bearing cap (300) is provided, wherein the second bearing cap (300) is fastened in the support (100) and positions the drive gear (42) axially and radially on an other side.

7. Gear drive unit (1) according to claim 3, wherein the support (100') and the first bearing cap (200) are joined to have the shape of a cup and position the drive gear (42) axially and radially on an other side.

8. A gear drive unit (1), which is fastened on a base part (50), the gear drive unit (1) comprising:
   a spindle (40), on which a drive gear (42) that drives the spindle (40) is provided;
   a drive assembly (20), which drives the drive gear (42) by means of a driven element (500);
   a gear housing (30) on which the drive assembly (20) is mounted and which operationally couples at least the driven element (500) and the drive gear (42); and
   at least one additional support (100, 100') positioned in the gear housing (30) such that the driven element (500) is disposed at least partially radially outside of the at least one additional support (100, 100'), the drive gear (42) being mounted in the at least one additional support (100, 100'), and the at least one support being fastened to the base part (50) and supporting the gear housing (30),
   wherein the at least one additional support (100, 100') has at least one radial opening (130), through which the driven element (500) and the drive gear (42) are connected to one another, and
   wherein the at least one additional support (100, 100') is substantially tubular in shape, the gear drive unit also comprising a first main assembly (2) including the spindle (40), the drive gear (42) and the at least one additional support (100, 100'), and a second main assembly (3) including the driven element (500), the drive assembly (20) and the gear housing (30), the second main assembly being fitted to the first main assembly, wherein a pin in the gear housing cooperates with a recess in the support to position the second main assembly with respect to the first main assembly.

9. A gear drive unit (1) according to claim 8, wherein the axial play of the drive gear (42) is minimized during assembly by pushing together the drive gear (42) and the support (100, 100') and pushing together or screwing down at least one bearing cap (200).

10. Gear drive unit (1) according to claim 1, wherein the support (100, 100') has a tubular wall having therein the radial opening.

11. Gear drive unit (1) according to claim 10, wherein the support (100') has the shape of a cup.

12. Gear drive unit (1) according to claim 10, wherein the tubular wall has a circumferential direction, and wherein the radial opening is elongated in the circumferential direction.

13. Gear drive unit (1) according to claim 8, wherein the support (100, 100') has a tubular wall having therein the radial opening.

14. Gear drive unit (1) according to claim 13, wherein the support (100') has the shape of a cup.

15. Gear drive unit (1) according to claim 13, wherein the tubular wall has a circumferential direction, and wherein the radial opening is elongated in the circumferential direction.

16. Gear drive unit (1) according to claim 1, wherein the at least one additional support (100, 100') has a substantially cylindrical outer surface.

17. Gear drive unit (1) according to claim 16, wherein the at least one radial opening (130) is formed through the cylindrical outer surface.

18. Gear drive unit (1) according to claim 1, wherein the at least one additional support (100, 100') has a substantially cylindrical outer surface along its entire length.

19. Gear drive unit (1) according to claim 3, wherein a second bearing cap (300) is provided, wherein the second bearing cap (300) is integral with the support (100') and positions the drive gear (42) axially and radially on an other side.

20. The gear drive unit of claim 1, wherein the customer interface is in the form of a recess in the circumference of the at least one additional support.

21. The gear drive unit of claim 1, wherein the customer interface is in the form of a projection from the circumference of the at least one additional support.

22. The gear drive unit of claim 8, wherein the second main assembly further includes a gear cover, wherein the gear cover at least partially surrounds the at least one additional support.

23. A gear drive unit (1), which is fastened on a base part (50), the gear drive unit (1) comprising:
  a spindle (40), on which a drive gear (42) that drives the spindle (40) is provided;
  a drive assembly (20), which drives the drive gear (42) by a driven element (500); and
  a gear housing (30) on which the drive assembly (20) is mounted and which operationally couples at least the driven element (500) and the drive gear (42),
  wherein at least one additional support (100') is positioned in the gear housing such that the driven element (500) is disposed at least partially radially outside of the at least one additional support (100'), and the drive gear (42) is mounted in the at least one additional support, and the at least one additional support is fastened to the base part (50) and supports the gear housing (30), in that the at least one additional support (100') is substantially pot-shaped, and in that the at least one additional support (100') has at least one radial opening (130), through which the driven element (500) of the drive assembly (20) and the drive gear (42) are connected to one another, and further wherein the spindle extends from each side of the at least one additional support.

* * * * *